No. 785,464. PATENTED MAR. 21, 1905.
N. B. WOOD.
NUT THREADING MACHINE.
APPLICATION FILED AUG. 12, 1903.
3 SHEETS—SHEET 3.
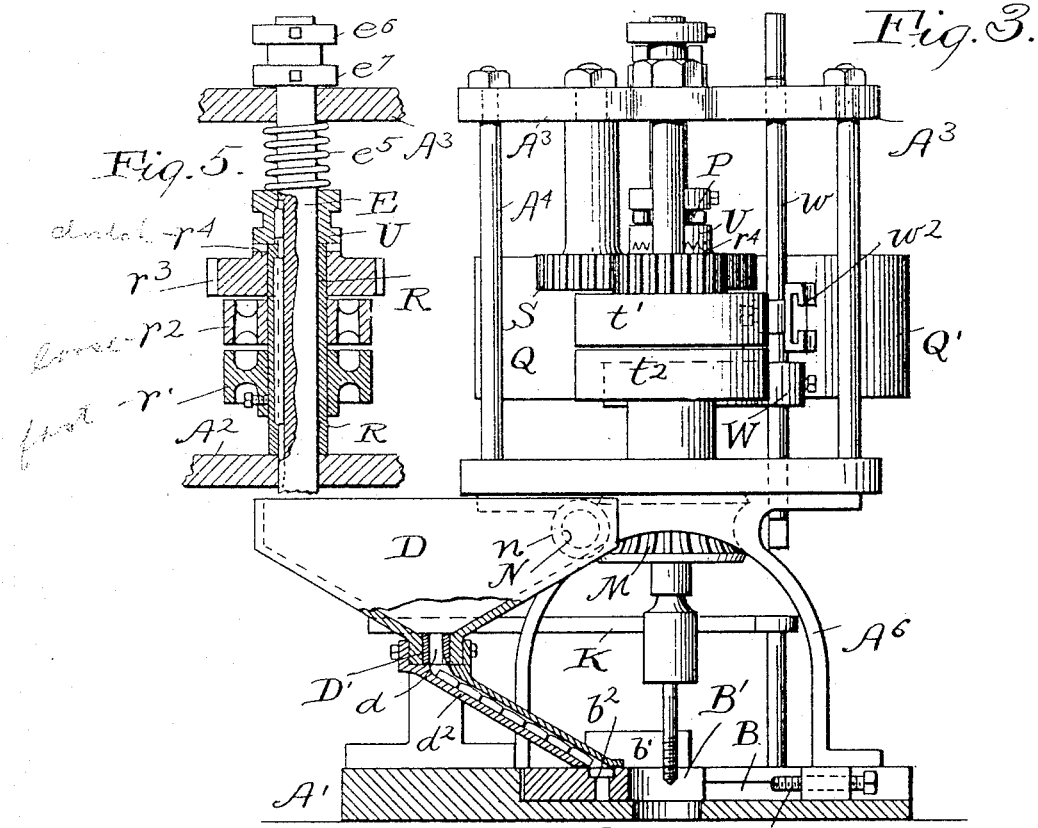
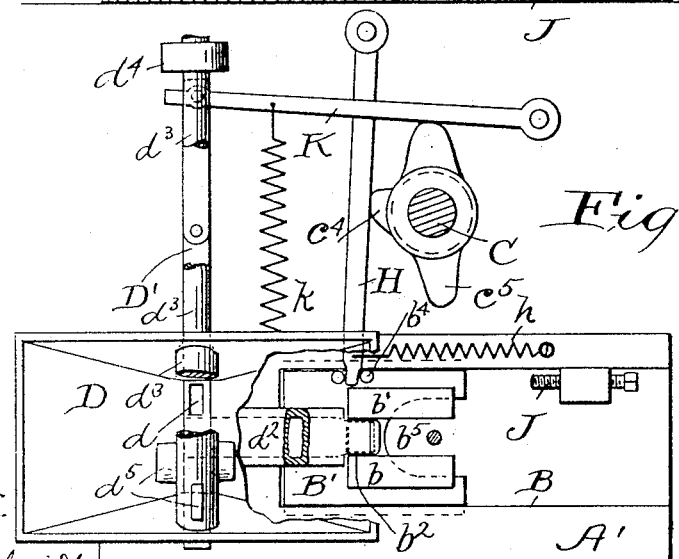
Witnesses.
Inventor:
Norman B. Wood
By his attorney
Thurston & Bates No. 785,464.

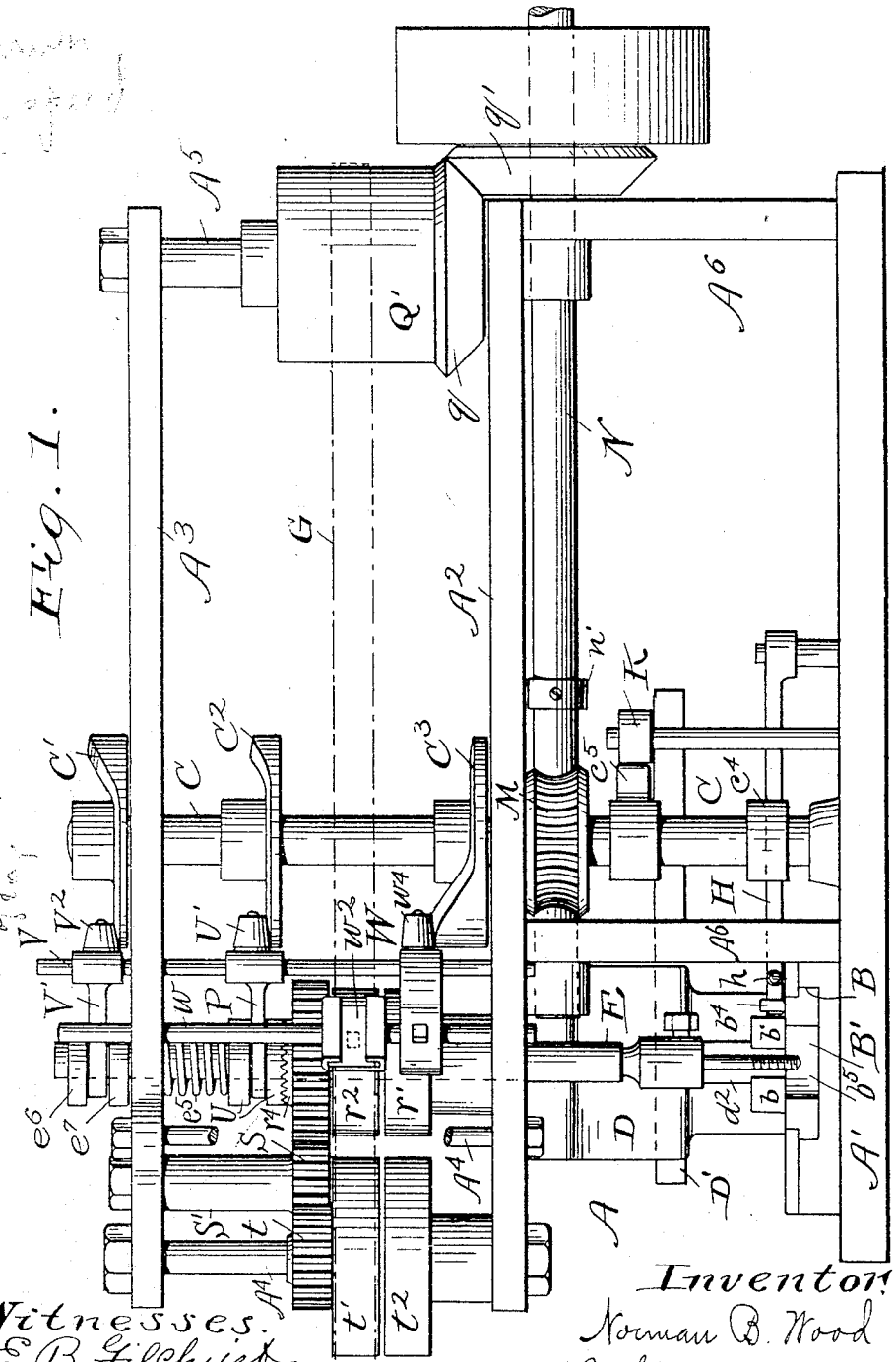

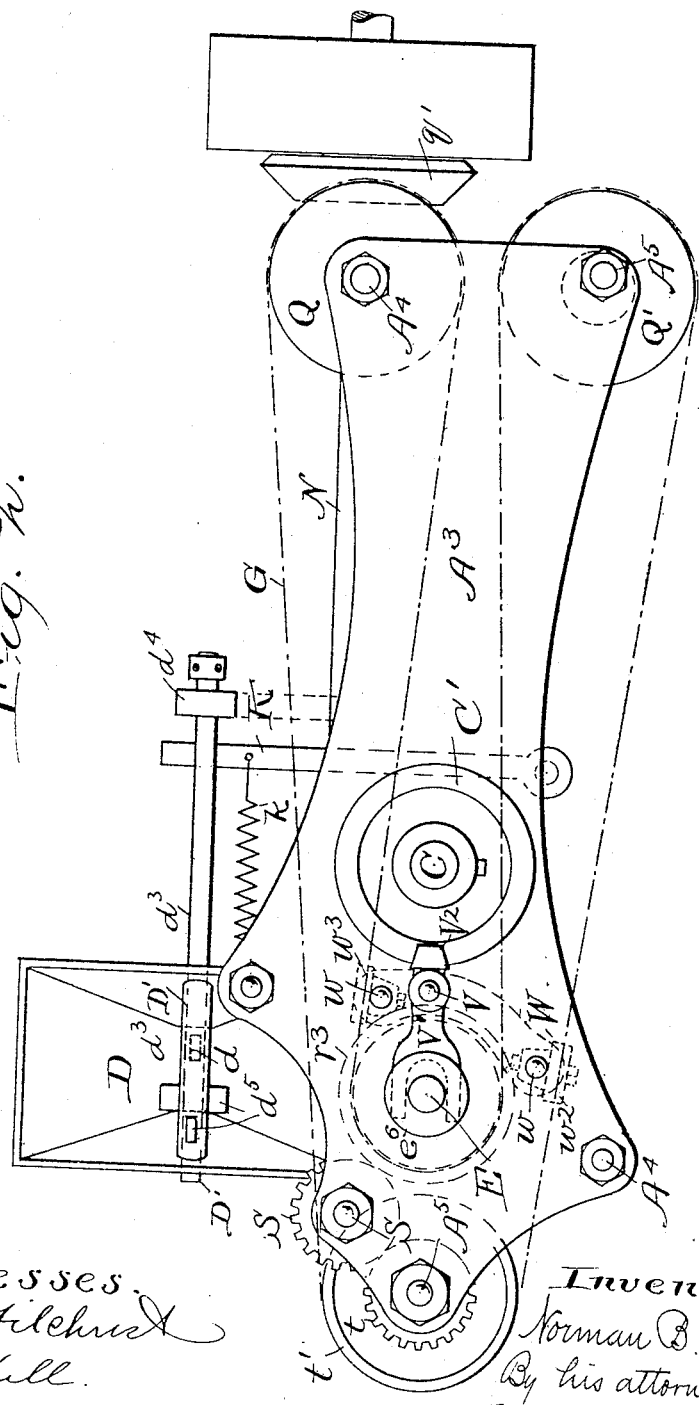

Patented March 21, 1905.

UNITED STATES PATENT OFFICE.

NORMAN B. WOOD, OF CUYAHOGA FALLS, OHIO, ASSIGNOR OF TWO-THIRDS TO ROBERT J. RODD AND CHARLES RODD, OF CUYAHOGA FALLS, OHIO.

NUT-THREADING MACHINE.

SPECIFICATION forming part of Letters Patent No. 785,464, dated March 21, 1905.

Application filed August 12, 1903. Serial No. 169,194.

*To all whom it may concern:*

Be it known that I, NORMAN B. WOOD, a citizen of the United States, residing at Cuyahoga Falls, in the county of Summit and State of Ohio, have invented a certain new and useful Improvement in Nut-Threading Machines, of which the following is a full, clear, and exact description, reference being had to the accompanying drawings.

The object of the invention is to provide an automatic machine which will take nut-blanks from a hopper and thread them rapidly.

The invention is to be found in certain mechanism in connection with the hopper and chute which supply the nut-blanks to the reciprocating slide and in mechanism for operating the tap whereby when it is cutting the thread it will be operated at slow speed and will be withdrawn at high speed and, still further, in mechanism for holding the nut from turning as the tap is withdrawn.

The invention, which is definitely set forth in the claims, may be here summarized as consisting in the construction and combination of parts hereinafter set forth in the following description and shown in the drawings.

Referring to the drawings, Figure 1 is a side elevation. Fig. 2 is a top plan. Fig. 3 is a front elevation showing a portion of the hopper broken away and showing the chute together with the base-plate and slide in section to more clearly show the parts. Fig. 4 is a top plan view of the hopper and the mechanism about the mouth of the chute. Fig. 5 is a detail view of the spindle and its associated mechanism.

In constructing a device according to the invention a frame A is employed of any suitable size and construction such that it will support the parts. In the top of the base-plate A' there is a transverse guideway B for receiving a slide B'. On this slide B' are a pair of jaws $b$ $b'$, which are adapted to operate as a wrench upon the threaded nut in a manner which will later appear. This slide is provided in its top side with a recess $b^2$ of a suitable size to receive and hold the nut while it is being threaded. This slide is reciprocated in the base-plate by a rocking lever H, which is pivoted to the framework and extends at one end between two pins $b^4$ on the slide. This lever H is operated by means of a cam $c^4$, rigidly carried by a cam-shaft C, a spring $h$ acting to hold this arm H against its cam. The forward movement of the slide from the point where it receives the nuts is limited by an adjustable stop-screw J, mounted on the base-plate.

To the rear of the slide upon the base-plate A' at any suitable point is the hopper D, adapted to hold the nut-blanks. This hopper has an inclined bottom, which serves to convey the blanks toward the center at the bottom, on which a feed-slide is arranged to operate. This feed-slide D' has through it an opening $d$ for receiving the blanks from the hopper and is arranged to register at one point in the path of its movement with the mouth of an inclined chute $d^2$, into which the nuts fall and down which they slide, and they are delivered to the recess $b^2$ in the slide B' when the same is in position under the lower end of said chute. The feed-slide D' receives reciprocating motion from an arm K, pivoted to the frame and arranged to coöperate with cams $c^5$, secured upon the cam-shaft C. A spring $k$ holds the arm K against its cam.

The tap-operating mechanism, together with the mechanism for rotating the cam-shaft C, will now be described. Above the base-plate A' are two plates $A^2$ $A^3$. The plate $A^2$ is supported by standards $A^6$ upon the base-plate A', and the plate $A^3$ is supported from the plate $A^2$ by means of standards $A^4$. These three plates A', $A^2$, and $A^3$ serve as bearings for the vertical cam-shaft C, which receives its motion from a worm-wheel M, which meshes with a worm $n$ upon the main driving-shaft.

Between the plates $A^2$ and $A^3$ is the mechanism for rotating the tap, and this mechanism consists of a tap-spindle E, vertically mounted in said plates in such a manner that it may be free to rotate and also to slide up and down in the frame. Embracing this spindle is a sleeve R, which is splined to the same and carries a driving-pulley $r'$ rigid with it. The sleeve R rests upon the frame $A^2$ and is thereby held in proper position upon the shaft E. On this sleeve also is a loose pulley $r^2$ and above that a gear $r^3$, independent of said pulley $r^2$ and having upon one face thereof a toothed clutch member $r^4$. This gear $r^3$ meshes with an idler-gear S, rotatably mounted upon a stud S', secured to the frame, and this gear S in turn meshes with the gear $t$, rigid with a driving-pulley $t'$, rotatably mounted upon one of the cylindrical standards $A^4$. Below this pulley $t'$ is a loose pulley $t^2$. The pulley $r'$ and the pulley $t^2$ are in the same horizontal plane. Likewise the pulley $r^2$ and the pulley $t'$ are in the same horizontal plane.

Above the clutch member $r^4$ is another clutch member U, splined to the tap-spindle, but adapted to slide upon the same. This clutch member is arranged to engage the clutch member $r^4$, and the teeth between these two members are substantially in the form of saw-teeth in cross-section, as shown, so that if great pressure is brought to bear upon the tap and it is prevented from rotating from any cause this upper member will be raised from the teeth of the lower member, and the tap will not be rotated, and hence the tap will not be broken. A spring $e^5$ is located between this clutch member U and the plate $A^3$ for the purpose of forcing it down upon the member $r^4$.

Above the plate $A^3$ the spindle E is provided with collars $e^6$ and $e^7$, spaced apart a sufficient distance to receive an operating-fork V', slidably mounted upon a rod V and having a friction-roller $V^2$ lying in the path of a cam C', carried by the cam-shaft C. The clutch member U is provided with an annular groove into which fits a fork P, adapted to slide also upon the rod V. This fork has a friction-roller U' extending out into the path of a cam $C^2$, carried by the cam-shaft C.

At any suitable point in the frame of the machine, preferably upon a cylindrical standard $A^4$, is a driving-drum Q. This drum is driven through a beveled gear $q$, rigid with the same and meshing with another beveled gear $q'$, rigid with the main driving-shaft N. Mounted upon another cylindrical standard $A^5$ of the frame is an idler-drum Q', which is of the same width as the drum Q. The body portion of the cylindrical standard $A^5$ upon which the drum Q' rotates is eccentric to the threaded portions which pass through the frame-plates, so that when the bolt is loosened and rotated it may be made to draw the drum Q' toward and away from the spindle mechanism, thus tightening or loosening a belt G which runs thereon. The endless belt G passes from the driving-drum Q around one of the pulleys $t'$ $t^2$, from thence back around the drum Q', and from there to one of the pulleys $r'$ $r^2$ and from there back to the drum Q.

A belt-shipper is provided to manipulate this belt G and this mechanism will now be set forth. At any suitable point, preferably above the plate $A^2$, is a belt-shipper W, rigidly secured to two vertically-disposed rods $w$ and $w$, which are slidably mounted in the frame. The rod $w$ carries a belt-hook $w^2$, which is arranged to embrace the part of the belt between one of the pulleys $t'$ and $t^2$ to the drum Q'. To the other rod $w$ is another belt-hook $w^3$, which is adapted to embrace the part of the belt passing from one of the pulleys $r'$ $r^2$ to the driving-drum Q. A friction-roller $w^4$ is rotatably mounted upon the belt-shipper W and projects out into the path of the cam $C^3$, carried by the cam-shaft C.

The complete operation of the machine as set forth is as follows: Rotary motion is given to the main shaft N, and this rotary motion is conveyed in turn to the driving-drum Q through the beveled gears before described. The driving of this drum Q drives the pulley $t'$, the belt-shipper being at that time elevated by its cam and the belt remaining loose upon the pulley $r^2$, as shown. This rotary motion is conveyed through the described gears to the clutch member $r^4$, which in turn rotates the clutch member U, and this, through its connection with the tap-spindle, rotates the tap in a direction to thread the nut. During this operation the cam-shaft C has been rotated by its mechanism and the feed-slide D' has been feeding blanks into the chute $d^2$. When the nut has been completely threaded, the cam $c^3$ has reached the point where it will allow lowering of the belt from the pulleys $t'$ and $r^2$ down upon the pulleys $t^2$ and $r'$. At the same time the clutch member U has been raised by its cam and the spindle E has likewise been raised by the cam C'. Then the spindle is free to rotate by the engagement of the belt G with the tight pulley $r'$, the pulley $t^2$ being loose as before stated. The direction of the driving of this pulley is in the reverse direction. Therefore the tap will be withdrawn from the threaded nut. When the spindle E is raised, as just described, it carries with it the nut from its recess in the slide B', so that the nut will be held between the jaws $b$ and $b'$ of the wrench. This prevents the turning of the nut as the tap is being withdrawn. In the meanwhile the slide, when it returns to its rearward position, has received another nut-blank, and as its cam moves away from its operating-arm this new blank will be carried forward under the tap, the nut just threaded dropping down through the curved portion $b^2$ of the slide before it brings another nut forward. The stop J always insures the proper positioning of the nut-blank with respect to the tap.

It will be readily understood from the foregoing description that if the tap should become blocked during the threading operation then the upper clutch member U would be raised from the lower clutch member $r^4$ by the inclined faces of the teeth engaging each other. The raising of this clutch member permits the clutch member $r^4$ to rotate thereunder without rotating the tap-spindle. Thus it will be seen in many instances the tap will be prevented from being broken and a warning would be given to the operator by the snapping of these two clutch members together.

The hopper D is provided with suitable agitating mechanism, which consists of a transverse shaft $d^3$, which extends from one side of the hopper to the other and projects out through one side, as shown in Fig. 4, where it is provided with a driving-pulley $d^4$, having a belt thereon, which is driven by a pulley $n'$ on the main shaft N. Upon this agitator are suitable arms $d^5$ for shifting the nut-blanks about in said hopper. This mechanism prevents the chucking of the blanks and always insures the proper feeding of the same to the chute $d^2$.

Having described my invention, I claim—

1. In a nut-threading machine, the combination, with the frame, of a spindle rotatably mounted in said frame, a sleeve splined to said spindle, a fast-speed driving-pulley rigid with said sleeve, a loose pulley upon said sleeve, a loose pulley mounted upon an independent shaft, a slow-motion driving-pulley mounted upon said shaft, gearing between said slow-motion driving-pulley and said spindle whereby said pulley may drive said spindle at slow speed to thread the nut, a belt for driving said pulley, and means whereby said belt may be shifted from said slow-speed driving-pulley and whereby another portion of the belt will be shifted onto the pulley keyed to said spindle and thereby rotate the same at high speed and withdraw the tap from the nut.

2. In a nut-threading machine, the combination, with the frame, of a spindle rotatably mounted in said frame, a sleeve splined to said spindle, a fast-speed driving-pulley rigid with said sleeve, a loose pulley upon said sleeve, a loose pulley mounted upon an independent shaft, a slow-motion driving-pulley mounted upon said shaft, a clutch member splined to said spindle, another clutch member loose upon said sleeve for engagement with said first-named clutch member, gearing between the clutch member upon said sleeve and the slow-speed driving-pulley, means for holding said clutch members together, an endless belt, when in one position, being adapted to drive the slow-speed driving-pulley, and when in the other position, adapted to drive the pulley rigid with said sleeve, and means for automatically shifting said belt.

3. In a nut-threading machine, the combination with the frame, of a tap-spindle rotatably mounted therein, a sleeve splined to said spindle, a pulley rigid with said sleeve, another pulley loose upon said sleeve, a gear loose upon said sleeve and having a clutch member rigid therewith, a counter-shaft, a loose pulley upon said counter-shaft in alinement with the pulley tight upon the sleeve, a gear rigid with said second-mentioned pulley upon said counter-shaft, gearing between said gear and the gear upon said sleeve, a clutch member splined to said spindle and adapted to coöperate with said other clutch member, a spring for retaining the engagement of said clutch members, means for automatically throwing said clutch members apart, means for reciprocating said spindle, a belt for operating said pulleys, and means for shifting said belt from one position to another.

4. In a nut-threading machine, the combination with the frame, of a driving-shaft, a spindle rotatably mounted in said frame, a sleeve splined on said spindle, means for holding said sleeve against endwise movement, a fast-speed pulley rigid with said sleeve, a loose pulley upon said sleeve, a pair of independent pulleys arranged to carry the belt operating upon the aforesaid pulleys, gearing between one of the pulleys of said pair and the spindle whereby said driving-shaft may drive said spindle at slow speed to thread the nut-blank, a single driving-belt, and means for shifting said belt from the pulley rigid upon said sleeve to the pulley loose upon the same.

5. In a nut-threading machine, in combination with a frame, a spindle rotatably mounted in said frame, a pulley having a driving connection with said spindle, another pulley adjacent to the same but running loose from said spindle, a pair of pulleys mounted upon an independent shaft and arranged in alinement with said other two pulleys, suitable gearing between one of the pulleys mounted upon said independent shaft and the tap-spindle whereby it may drive the same at slow speed, driving mechanism, an endless belt passing from said driving mechanism to said pulleys, whereby when the belt is upon the pulley which is in direct driving connection with the spindle, it will rotate it at high speed, and when it is upon the loose pulleys upon said spindle it will be driving it through the other one of the gears upon said independent shaft at slow speed, and means for shifting the belt.

In testimony whereof I hereunto affix my signature in the presence of two witnesses.

NORMAN B. WOOD.

Witnesses:
E. B. GILCHRIST,
J. B. HULL.